United States Patent [19]
Lewis

[11] 3,866,940
[45] Feb. 18, 1975

[54] DIFFERENTIALLY INFLATABLE RESTRAINING BAND FOR VEHICLES

[75] Inventor: Donald Joseph Lewis, Troy, Mich.

[73] Assignee: Allied Chemical Corporation, Morristown, N.J.

[22] Filed: Jan. 11, 1973

[21] Appl. No.: 322,653

[52] U.S. Cl. .............................. 280/150 AB, 9/316
[51] Int. Cl. ........................................... B60r 21/10
[58] Field of Search ................. 280/150 AB, 150 B; 244/151 R; 9/316-330

[56] References Cited
UNITED STATES PATENTS

| | | |
|---|---|---|
| 1,701,927 | 2/1929 | Lange ..................................... 9/322 |
| 2,202,415 | 5/1940 | Christopher et al. .................... 9/316 |
| 3,146,460 | 9/1964 | Henderson .................... 280/150 AB |
| 3,302,973 | 2/1967 | Ravau ............................. 244/151 R |
| 3,430,979 | 3/1969 | Terry et al. .................... 280/150 AB |
| 3,682,498 | 8/1972 | Rutzki .......................... 280/150 AB |
| 3,706,463 | 12/1972 | Lipkin .......................... 280/150 AB |
| 3,801,156 | 4/1974 | Granig .......................... 280/150 AB |

Primary Examiner—Kenneth H. Betts
Attorney, Agent, or Firm—Jonathan Plaut; Patrick L. Henry

[57] ABSTRACT

A unitary inflatable restraining band for vehicle safety systems having a series of sections, some of which are inflatable to a greater degree than others.

2 Claims, 8 Drawing Figures

DIFFERENTIALLY INFLATABLE RESTRAINING BAND FOR VEHICLES

FIELD OF THIS INVENTION

This invention relates to safety devices for vehicle occupants, more particularly to inflatable restraining band safety devices.

DESCRIPTION OF THE PRIOR ART

Seat belt devices to secure vehicular occupants in their seats in general use today usually include two sections of seat belt webbing, each of which has one end mounted to the vehicle with the other ends attached to a buckle and a cooperating tongue. Such seat belts are designed to restrain an occupant in his seat during a collision by limiting the forward motion of the occupant with respect to his seat as a result of the collision. That is, the wearer moves forward and impacts against the seat belt webbing which thereafter restrains him against further forward motion.

Safety devices of the air bag type have been proposed in which an inflatable air bag is mounted in the interior of the vehicle and is inflated in response to a sensing device which is actuated by a collision of the vehicle. Air bags are designed to prevent the occupant from striking the vehicle structure and operate by cushioning the forward motion of the occupant during a collision.

It has been proposed to combine the two types of safety devices mentioned above, as, for example in U.S. Pat. No. 3,682,498 to Rutzki, and my copending application Ser. No. 290,917 entitled "Vehicle Safety System" filed on Sept. 21, 1972, which application is hereby incorporated herein as reference.

SUMMARY OF THE INVENTION

In accordance with this invention, an improved vehicle safety system is provided which comprises an inflatable restraining means comprising a unitary inflatable member, said inflatable member being comprised of a plurality of inflatable first sections connected by at least one intermediate section, said first sections being inflatable to a cross-section greater than said intermediate section of the inflatable portion, and means for inflating said inflatable first sections in response to a preselected condition of the vehicle.

More particularly, a vehicle safety system of the inflatable restraining band type is provided in which the inflatable restraining band has a series of inflatable sections which expand to a greater degree than other sections. This may be accomplished by providing an inflatable band wherein some portions are narrower than others, or alternatively by a band of uniform width wherein portions thereof are stitched in the folded condition with frangible stitching, and some are not, to allow greater expansion of some portions than others. In this manner, there is provided a unitary inflatable band for occupant restraint which can be adapted to different environments.

BRIEF DESCRIPTION OF THE DRAWINGS

FIG. 3-A is an enlarged sectional view similar to FIG. 3 with the band in its folded posture.

DESCRIPTION OF THE PREFERRED EMBODIMENT

In accordance with a preferred embodiment of this invention, a unitary inflatable restraining band safety device 10 is provided for vehicle occupants which comprises a series of hollow portions 12, 14, 16, some of which are inflatable to a greater degree than others and which are adapted to be inflated prior to any substantial forward motion of the wearer with respect to his seat as a result of a collision of the vehicle or other predetermined condition which is sensed by a sensing means.

The term "vehicle" as used herein refers to conveyances for carrying people such as automobiles, aircraft and the like.

Figure 1:
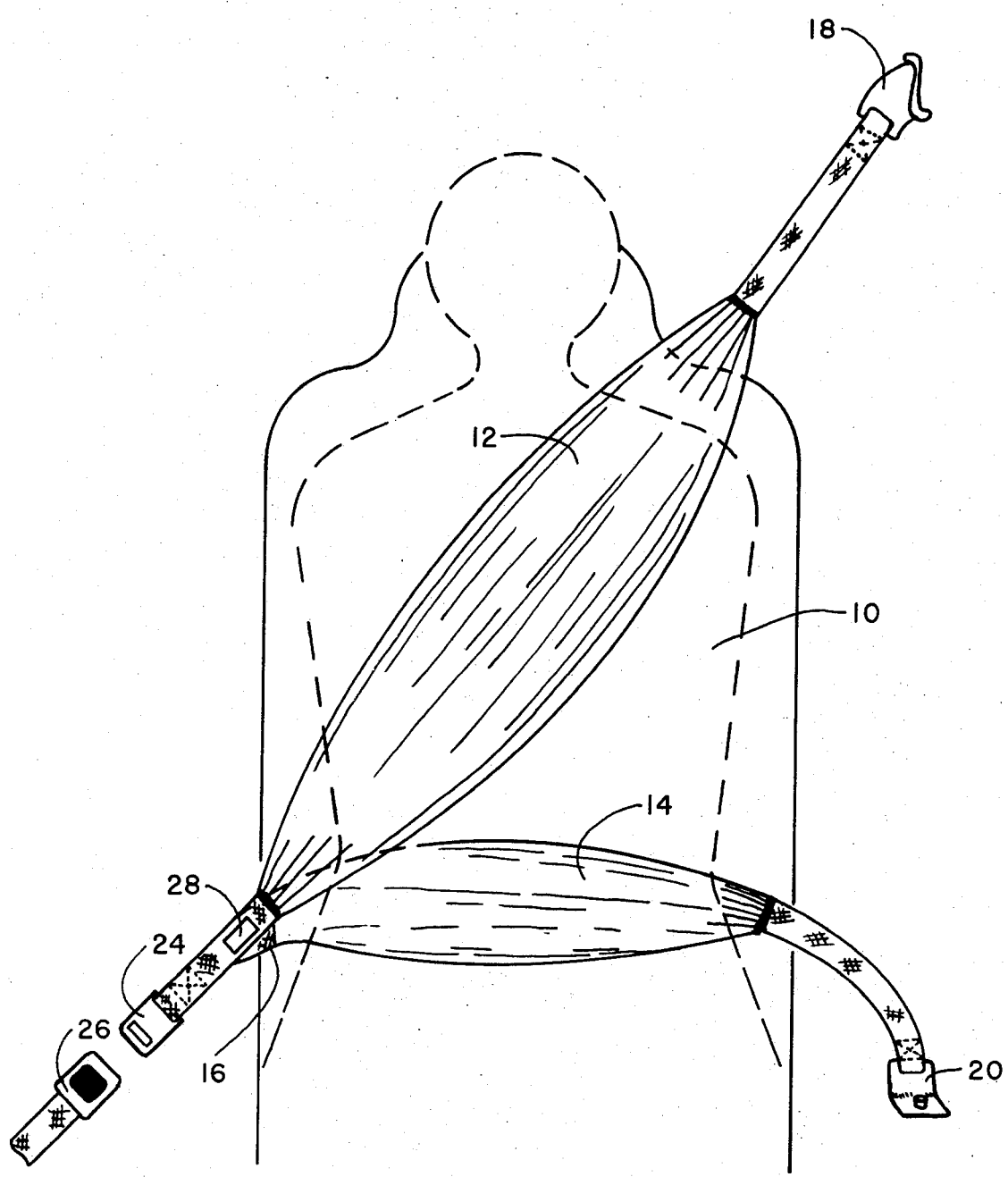
FIG. 1 is a perspective view of one embodiment of the inflatable band of this invention fastened about an occupant of a vehicle.
Figure 2:
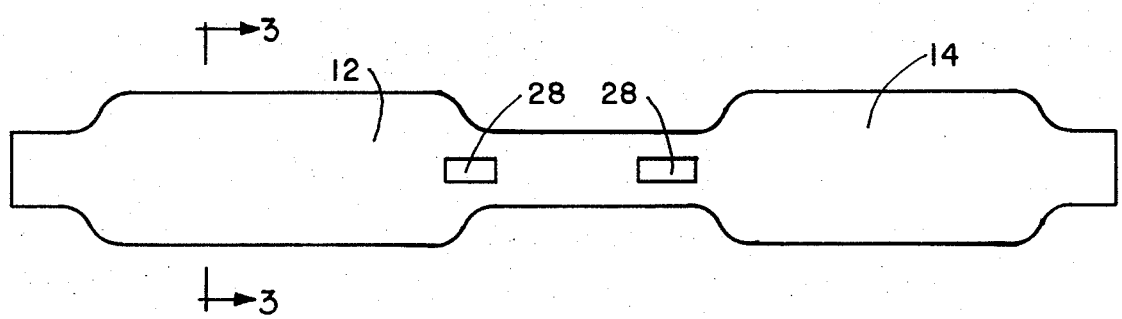
FIG. 2 is a plan view of the band of FIG. 1 prior to assembly of the buckle and other attachments.
Figure 3:
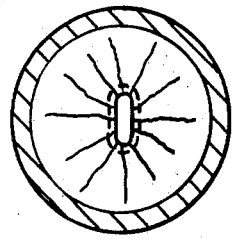
FIG. 3 is a sectional view taken along line 3—3 of FIG. 2 with the band in its inflated posture.

Referring to the drawings wherein some reference numerals refer to the same or like parts, a unitary inflatable band restraining means 10 includes inflatable sections 12, 14, intermediate section 16 and end sections 18, 20. Band 10 is preferably formed of a generally tubular sleeve and is normally maintained in the form of an uninflated hollow tube as shown in FIGS. 3-A and 6.

Inflatable sections 12 and 14 are normally rolled, folded or otherwise maintained in the uninflated position. Preferably, the band 10 including sections 12, 14 is folded to provide a seemingly flat (that is, generally two-dimensional) seat belt section as in FIGS. 3-A and 6; and the folds are maintained in the tube by suitable fastening means such as stitches 22 or the like.

The band 10 is preferably formed from a section of material of a tubular configuration which is cut to the desired length to provide a unitary structure having continuous inner and outer walls. Alternatively, the band may be formed from a plurality of flat lengths of material which are connected to each other along their longitudinal edges directly by means of stitching, slips, adhesive or other fastening means or indirectly by means of an intermediate strip of material, suitably attached to each flat fabric by similar fastening means. However, a unitary section of tubular fabric is preferred because of its high strength.

Although it is preferred to form the band 10 from a tube of fabric, it may alternatively be formed from high strength plastic or rubber materials by such processes as extrusion, etc. For example, the webbing may be formed from tubular stock of nylon, polyester, polyethylene, polypropylene, or other plastics or rubber.

It is desired that band 10 be of relatively low porosity, that is, have a relatively low gas permeability, so that inflatable sections 12, 14 when inflated with a gas retain their inflated state by substantially preventing escape of the gas. For this purpose, band 10 is preferably woven tightly and is coated or otherwise provided with a nonporous coating. Any conventional coating composition may be utilized for this purpose, such as polyurethanes, rubbers, etc., and the quantities utilized depend upon the type of fabric to be coated, the coating composition, as well as other factors which are apparent to those skilled in the art. In certain instances, it may be desired to provide band 10 with a desired degree of porosity, such as by eliminating the impervious coating or providing apertures in the webbing.

The two expandable portions 12, 14 of band 10 are connected by intermediate portion 16 which is normally fastened to buckle tongue 24 which is adapted to be attached to a buckle 26 secured to the vehicle. Ends 18 and 20 are normally fastened to the vehicle at the ceiling and floor, respectively.

Figure 3A:
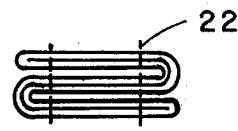

Referring to FIGS. 1-3A, an inflatable band is provided wherein the inflatable sections 12, 14 and intermediate section 16 are formed in a sausage-like configuration either by weaving or extruding a tubular band of alternate large and small corss-section or forming flat band into such a configuration by sewing, pasting, or the like. Intermediate section 16 is preferably the desired width of the band 10 in its folded condition as shown in FIG. 3A. The band is normally held in its folded condition along its longitudinal axis by frangible stitches 22 in an "N" or "W" configuration as in FIGS. 3A and 5.

Inflating mechanism 28 may be located at the buckle tongue 24 and connected to the inflatable band interior of one or both portions 12, 14 via intermediate section 16 by conventional means. Alternately, inflating mechanisms 28 may be in communication with inflatable portions 12, 14 adjacent the outer ends 18 and 20. Inflatable sections 12, 14 may be in gas communication with one another via intermediate section 16.

Inasmuch as seat belt buckles and retractors are well known in the art and may be of a variety of designs, they are not specifically described herein.

The advantage of such a unitary restraint system is that it provides a strong, efficient inflatable restraint having a unitary lap belt and shoulder bands which are inflatable. Inflating means 28 is selected to inflate the inflatable band in a very short time after actuation thereof by a sensing means by introducing gas into the inflatable band sections 12, 14. For this purpose, sensing means 30 is provided which is electrically connected to and actuates inflating means 28 immediately upon sensing a preselected condition of the vehicle (e.g., as in a collision or upon rapid deceleration of the vehicle). Sensing means 30 is capable of sensing and actuating the inflating means before any substantial forward movement of the wearer as a result of the occurrence of the preselected condition. The sensing means may be any vehicle sensitive device which can sense and actuate the inflating means 28 within a desired very short period of time after occurrence of such condition. As sensing means there may be provided any of the sensing devices which are suitable for use with an inflatable air bag restraining system, such as sensing devices of the inertia type and the crush type. Such sensing means are known in the art and thus are not more particularly described herein. Examples of suitable sensing devices are those shown in U.S. Pat. No. 3,668,063 to Bell. As stated above, such sensing means are responsive to a condition of the vehicle, most preferably a collision thereof, rather than being responsive to the movement of the wearer into the restraining device. As a result, the vehicle safety system thereof is capable of restraining the wearer prior to his moving with respect to his seat as a result of a collision.

The inflating means 28 include a gas source which may be of the gas generating type (activated by means of a pyrotechnic device, for example) or stored gas type or a combination of both. As these gas sources also are known in the art, particularly with respect to proposed air bag restraint systems, they are not specifically described herein.

Inflating means 28 is connected to the exterior of sections 12, 14 or 16 or may be located interiorly thereof. When inflating means 28 is located outside inflatable sections 12, 14 the gas source may be provided with suitable tubing or the like to connect with the interior of sections 12, 14. When stored gas is used as the gas source, a valve or similar device may be provided to separate the gas source and connecting tubing. Such a valve would normally be closed but is opened upon actuation of inflating means 28 by sensing means 30. Valves may also be employed with hybrid gas sources (that is, a combination of stored and generated gas) or generated gas sources, as desired. When inflating means 28 is located outside of inflatable sections 12, 14, it is preferably connected to the retracting portion of the restraint by means of suitable tubing or the like, which portion has connected thereto a tongue portion of a buckle. The gas source may be provided at any desired location within the vehicle, such as under a seat thereof, affixed to the floor, side portion or ceiling, etc.

In an alternate embodiment (FIG. 4), the inflating means may be located interiorly of inflatable sections 12, 14. For example, gas storage cartridges 32 may be provided in inflatable section 12, 14 which cartridges are preferably filled with a pressurized gas and are electrically connected to sensing means 30. Such gas may comprise nitrogen, air, argon, etc. Cartridges 32 are adapted to release the contained gas into inflatable sections 12, 14 upon receipt of an electrical signal from sensor 30. For example, cartridges 32 may include a valve which is opened in response to an electrical signal from sensor 30 to release gas interiorly of the inflatable section to inflate the same.

Cartridges 32 may be held in place interiorly of inflatable band section 12 by any suitable means, such as by stitching, and are preferably located adjacent to a tongue portion of a buckle.

In operation, unitary inflatable band 10, including both shoulder and lap sections, is secured about the body of the wearer. When a collision or other preselected condition of the vehicle occurs, sensing means 30 senses the same and immediately signals and actuates inflating means 28 which thereupon introduces a gas into the inflatable portions 12, 14. The force of the gas introduced into and expanding within inflatable portions 12, 14 is sufficient to break the stitches 22 which normally hold the inflatable shoulder portion 12 and lap portion 14 in their uninflated state, and inflate these sections. The intermediate portion 16 being of small width does not exert a significant radial strain against tongue 24. Inflatable shoulder portion 12 should be from 20 inches to 30 inches preferably from 24-28 inches long; and lap portion 14 should be from 10-25 inches long, preferably from 14-18 inches long. Both expand to a circumference of 15-25 inches, preferably 18-22 inches. The shoulder portion 12 should be inflated to a volume of 400-800 cubic inches, preferably 600-700 cubic inches, and the lap portion should be inflated to a volume of 200–500 cubic inches, preferably 300–400 cubic inches.

Figure 4:
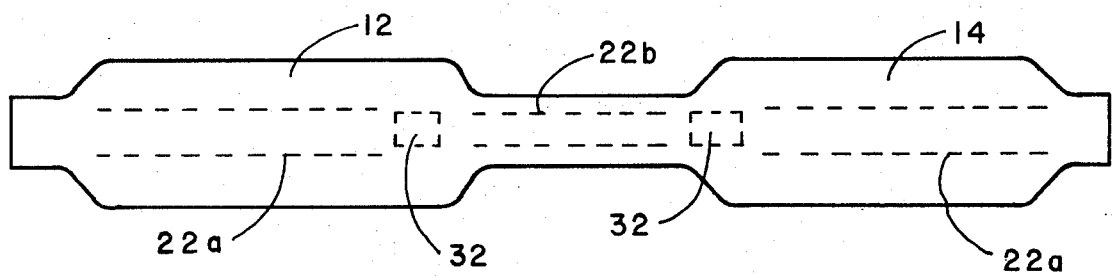
FIG. 4 is a view, similar to FIG. 2, of an alternate embodiment of the inflatable band of this invention.
Figure 5:
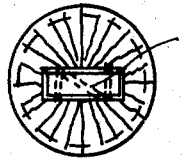
FIG. 5 is a sectional view taken on line 5—5 of FIG. 4.
Figure 6:
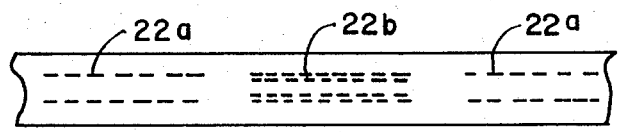
FIG. 6 is a view showing the belt of FIG. 4 in its folded condition.
Figure 7:
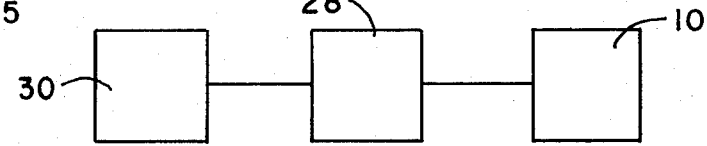
FIG. 7 is a schematic diagram of the sensing and inflating mechanism associated with this invention.

In the alternate embodiment of FIGS. 4 to 6, the inflatable band 10 is formed from tubing having a uniform diameter along the length thereof. In this embodiment, a portion or portions of the band are restrained from expansion due to nonfrangible stitching 22b or other restraining material at that portion of the band. The band 10 in its normal condition would be stitched with stitching 22a, 22b into a cross-sectional configuration as shown in FIG. 5. This stitching comprises frangible stitching 22a along those sections 12, 14 of the band where inflation is desired and nonfrangible stitching 22b along section 16 where inflation is not desired. In this manner, inflation would extend only along those portions of the belt held in folded condition by the frangible stitching.

While exemplary embodiments of the invention have been described, the true scope of the invention is to be determined from the following claims.

I claim:

1. Inflatable restraining means for a vehicle safety system comprising a unitary inflatable member folded in uninflated condition to be in the form of a seat belt with frangible means ruptured on commencement of inflation to obtain full inflation thereof, said folded inflatable member comprised of a plurality of inflatable first sections integral therewith containing said frangible means connected by at least one uninflated intermediate section integral therewith, said first sections being inflatable to a cross-section greater than said uninflated intermediate section; said unitary member extending at uninflated sections to points of connection on the vehicle, said first inflatable sections in gas communication with one another via said intermediate section unitary therewith, said first inflatable sections comprise a lap and shoulder restraining portion, and the intermediate section secured to a portion of a buckle and containing said means for inflating said sections, and means for restricting radial expansion of said intermediate section, means capable of rupturing said frangible means on commencement of inflation of said member in response to a preselected condition of the vehicle.

2. Inflatable restraining means of claim 1 wherein stitching is provided to maintain said inflatable member in folded position, said stitching being frangible to allow inflation of the first portions and nonfrangible to prevent inflation of the intermediate section.

* * * * *